United States Patent Office 2,893,058
Patented July 7, 1959

2,893,058

SEAL RING

John W. Wurtz, San Gabriel, and Walter C. Bowker, Compton, Calif., assignors, by mesne assignments, to Federal-Mogul-Bower Bearings, Inc., Detroit, Mich., a corporation of Michigan Application June 24, 1955, Serial No. 517,796

4 Claims. (Cl. 18—42)

This invention relates to resilient sealing rings of the type having a reinforcing ring embedded therewithin, and more particularly to a unique technique for making the same.

Sealing rings of the type referred to are known in the trade as cored O-rings because they differ from conventional O-rings in having a solid core of a suitable rigid material covered with rubber or synthetic elastomer. The wide-scale use of these composite rings have been thwarted by lack of satisfactory low-cost method for making them in quantity and to the required precision. This is particularly true with respect to sizes of one inch diameter and smaller due to the difficulty experienced in holding the small core rings in the fingers while covering them with pre-formed but uncured elastomer.

The simple but rugged mold provided by the present invention makes use of a separable part designed to interfit between a pair of curing mold members temporarily merely to pre-form the uncured stock for reception of the reinforcing ring. When this step has been accomplished, the separable part is put aside and a reinforcing ring is assembled into one of the pre-form cavities before closing the two main core members together for the curing operation. By virtue of this technique, the ring is held accurately positioned in any desired location within the elastomer until the latter has been vulcanized.

Accordingly, a primary object of the present invention is the provision of a new mode of making cored O-rings economically and to high precision standards.

Another object is the provision of a new and improved mode of making the elastomeric covering for a cored O-ring while the covering is uncured and thereafter vulcanizing it about a rigid core member.

Yet another object is the provision of a simple technique for forming the semi-finished covering for a cored O-ring in two halves and then vulcanizing the same about a ring.

Numerous other objects and advantages of the invention will become apparent from the following detailed specification taken with the accompanying drawings, wherein.

Figure 1:
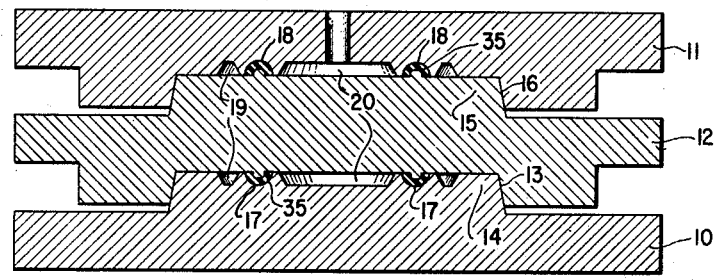
Figure 1 is a vertical sectional view of the mold in closed position against the stock during the pre-forming operation.

Referring to the drawings, it will be seen that the invention can be practiced by the use of a mold comprising a lower core member 10, an upper core member 11 and a center core plate 12. By comparing Figures 1 and 2 it will be apparent that core plate 12 is so formed that its lower recess 13 nests snugly over tapered boss 14 of ring 10 while a similarly tapered boss 15 on its upper surface nests snugly within recess 16 of the upper core plate. It will therefore be self-evident that boss 14 and recess 16 of the upper and lower core members can be accurately nested together after core plate 12 has been removed.

Figure 2:
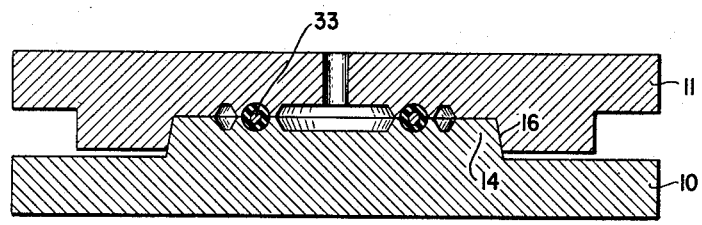
Figure 2 is a similar view of the mold but with the center core plate removed and a reinforcing ring in place between the elastomeric covering.

The mating surfaces of rings 10 and 11 are provided with identical semi-circular annular channels 17 and 18 positioned to register exactly with one another when the core rings are closed together since they are concentric with the circular boss 14 and recess 16 respectively as made clear by Figure 2. Spaced to either side of the mold cavities formed by channels 17 and 18 are rind cavities 19 and 20 for receiving excess stock or prep material charged into the mold cavities.

Figure 4:
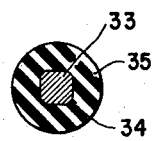
Figures 4, 5 and 6 are sectional views through typical cored rings after the same have been removed from the mold.
Figure 5:
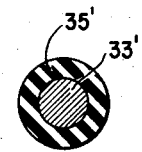
Figure 6:
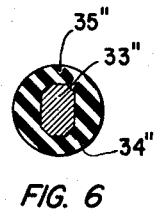

One of the features of the core plate is the provision of annular flanges 21 and 22 protruding from its upper and lower surfaces. These flanges are positioned to register with the center of mold cavities 17 and 18 since they are concentric with each other and the circular boss 15 and recess 13 as clearly shown in Figure 1. The combined height of flanges 21 and 22 is equal to or slightly less than the axial width of the reinforcing ring to be embedded in the finished O-ring. In other words, each flange forms one-half of the cavity for the reinforcing ring wherever it is desired to locate the ring centrally of the O-ring. It will, of course, be appreciated that in certain applications it will be desirable to locate the reinforcing ring off-center in either an axial or a radial direction. In this event, it is but necessary to form flanges 21 and 22 in the desired location to achieve this objective. Usually, of course, the ring will be centered in the finished product in the manner illustrated in Figures 4 to 6.

The mold is used in the following manner. Upon disassembly, core ring 11 is laid on its back beside ring 10. Cavities 17 and 18 are then charged with measured quantities of uncured elastomeric prep material compounded from synthetic rubber of any suitable type. Usually, the finished ring will be used in contact with lubricating mediums in which event the operator will wish to employ a compound resistant to lubricants of which there are a variety readily available on the market and well-known to those skilled in the trade. The operator exercises care in slightly over-charging the cavities to assure complete and uniform filling of the same before the insertion of the reinforcing ring. To this end, it may also be desirable to so design flanges 21 and 22 that their combined cross-sectional area is slightly less than that of the ring to be embedded in the elastomer. After the prep has been placed in the cavities, the core plate is assembled onto core member 11 and pressed downward lightly and this sub-assembly is then overturned onto bottom core ring 10.

Figure 3:
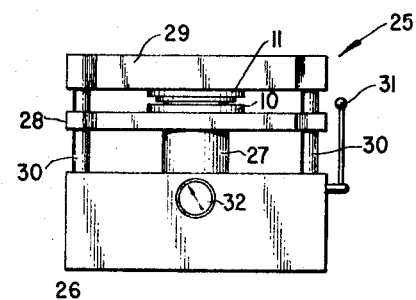
Figure 3 is an elevational view of the mold shown in Figure 2 in place in a molding press.

The assembled mold is now ready for insertion between the platens of a conventional hydraulic molding press. A typical press generally designated 25 is illustrated in Figure 3. The press includes a base 26 enclosing the hydraulic pumps and cylinder from which the vertically movable piston 27 rises. The upper end of this piston bears against lower platen 28. The upper platen 29 is supported by high-strength columns 30 along which lower platen 28 is vertically movable. Both platens are preferably heated, as by electricity or steam, to a temperature suitable for the particular material being vulcanized. A control lever 31 may be manipulated to apply a desired pressure to the platens as indicated by gage 32.

Initially, the three-part mold is placed beneath the platens of the press and closed snugly together for a brief interval merely for the purpose of distributing the prep uniformly throughout the mold cavity and for making an impression or channel in each piece of prep suitable for the reception of the reinforcing ring. Ordinarily, substantially no curing of the stock will take place during this part of the operation because of its short duration. The press is then opened so that core plate 12 can be removed and a reinforcing ring 33 of the desired shape is laid into the cavity formed by flange 22 in the prep supported in core ring 10.

Figure 7:
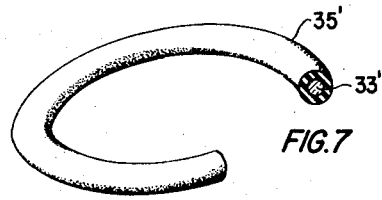
Figure 7 is a view of a completed ring with a section cut away.
Figure 8:
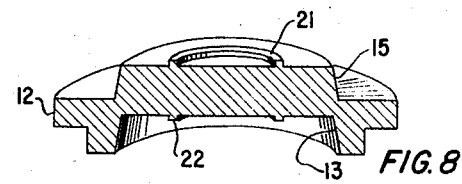
Figure 8 is an isometric view of the core plate with one half broken away.

As soon as ring 11 is nested over lower ring 10, the mold is returned to the press for the final molding and vulcanizing operation. Figure 3 illustrates the mold in the press for this step of the operation during which the mold is held closed under considerable pressure, and heat at a suitable temperature is applied until the prep has been throughly cured. The mold is then removed, opened, and the finished product is removed. Ordinarily, thin flashings of excess stock will extend radially from the inner and outer rims of the ring. This is easily removed in accordance with conventional techniques to provide a finished product such as that illustrated in Figure 7. The reinforcing ring 33', here shown as circular in cross-section, will be exactly centered within a resilient vulcanized covering of synthetic elastomer 35'. Moreover, and of particular importance, each individual ring made according to the above described technique will be identical in every respect to one another.

Although the rings herein shown have a circular exterior contour, it will be appreciated that this may be changed at will to meet the requirements of a particular application. Ordinarily, the reinforcing ring 33 will be of metal and continuous. If the reinforcing ring has flat sides, then it will be desirable in most instances to chamfer the corners as indicated at 34 and 34" in Figures 4 and 6. This eliminates the possibility of cutting the resilient covering, either during the molding operation or while the ring is in its assembled operating position.

We claim:

1. A compression mold for encasing an annular metal case in a thin covering of resilient elastomeric material while very accurately locating said core within said covering, so as to produce exceptionally accurately formed cored O-rings, said mold comprising upper and lower core blocks and a center core plate, said blocks and said plate having interfitting tapering surfaces adapted to nest together interchangeably and accurately positioned in triplicate as well as in pairs, said core blocks having annular channels in their opposed faces adapted to register very accurately with one another to form a cavity for an O-ring, said center plate having aligned annular flanges extending from its opposite faces and adapted to project one into each of said channels of said core blocks at an exact relation therewith and form a depression the exact size of said metal core accurately positioned in said elastomeric material placed in said channel, two halves of said elastomeric material being molded while said mold is assembled in triplicate and then said center core plate being removed, neither half of said elastomeric material being removed from its core block, a metal core ring placed in one of said depressions, and said core blocks then being closed together and the elastomer cured about the accurately positioned embedded ring.

2. A compression mold for making O-rings having a rigid ring accurately positioned within and embedded within a thin elastomeric covering of uniform thickness, said mold comprising: a core plate adapted to be sandwiched between upper and lower core blocks in accurately aligned predetermined positions by means of cooperating male and female locators, the locators on said upper and lower core blocks being adapted to interfit tightly with one another when said core plate is removed from between them and to then positively position said core blocks relatively to each other because of the engagement of said complemental locators and, when said core plate is therebetween to engage tightly the complemental co-cators on said core plate, said core blocks having annular channels of semi-circular cross-section adapted to register precisely with one another to form a mold cavity for an O-ring, said core plate having annular flanges extending from its opposite surfaces directly opposite each other and into accurately positioned locations within said core block channels when the core plate is sandwiched between said core blocks, whereby a said rigid ring can later be inserted in a cavity formed in the molded material by said annular flanges, said core plate removed and said core blocks closed together and the molded material cured about the exterior of said rigid ring.

3. A compression mold for making reinforced O-rings having a thin elastomeric covering around a rigid reinforcing ring, said ring being accurately positioned within said covering, said mold comprising: a pair of mold core annuli having semi-circular annular cavities in their mating faces adapted to be closed in alignment with one another, said core annuli having annular tapered interfitting surfaces that fit snugly together for nesting them together with their said cavities in exact registry, and means for pre-forming uncured elastomer charged separately into each of said cavities to provide them with a continuous, open-topped channel, said means comprising a core plate member having upstanding annular flanges on the faces thereof positioned to extend one into each of said cavities, and annular tapered surfaces on opposite sides of said core plate adapted to engage snugly with and to mate accurately with the interfitting surfaces on each of said core annuli and effective to center said core plate accurately with respect to said core annuli.

4. A compression mold in accordance with claim 3 in which the annular cavities in the mold cores are concentric with the annular tapered interfitting surfaces and the annular flanges on the core plate member are concentric with each other and with the annular tapered surfaces on the opposite sides of the core plate member.

References Cited in the file of this patent

UNITED STATES PATENTS

| | | |
|---|---|---|
| 1,400,146 | Eggers et al. | Dec. 13, 1921 |
| 1,575,388 | Roberts | Mar. 2, 1926 |
| 1,577,132 | Lawton | Mar. 16, 1926 |
| 2,148,079 | Martin | Feb. 21, 1939 |
| 2,254,233 | Meyer | Sept. 2, 1941 |
| 2,287,270 | Partridge | June 28, 1942 |
| 2,342,404 | Jakeway | Feb. 22, 1944 |
| 2,355,978 | Kellar | Aug. 15, 1944 |
| 2,358,259 | Siedschlag et al. | Sept. 12, 1944 |
| 2,537,089 | Remple | Jan. 9, 1951 |
| 2,717,024 | Jelinek | Sept. 6, 1955 |